(12) United States Patent  
Grillos et al.

(10) Patent No.: US 9,469,418 B1
(45) Date of Patent: Oct. 18, 2016

(54) COMPOSITE STRUCTURES FOR AEROSPACE VEHICLES, AND ASSOCIATED SYSTEMS AND METHODS

(71) Applicant: Blue Origin, LLC, Kent, WA (US)

(72) Inventors: Emmanuel Grillos, Kent, WA (US); Dennis Arthur Trimble, Seattle, WA (US); Douglas Lewis Grose, Auburn, WA (US)

(73) Assignee: Blue Origin, LLC, Kent, WA (US)

( * ) Notice: Subject to any disclaimer, the term of this patent is extended or adjusted under 35 U.S.C. 154(b) by 0 days.

(21) Appl. No.: 14/733,824

(22) Filed: Jun. 8, 2015

Related U.S. Application Data

(63) Continuation of application No. 13/029,007, filed on Feb. 16, 2011, now Pat. No. 9,079,674, which is a continuation of application No. 12/885,346, filed on Sep. 17, 2010, now abandoned.

(60) Provisional application No. 61/244,006, filed on Sep. 18, 2009, provisional application No. 61/244,008, filed on Sep. 18, 2009.

(51) Int. Cl.
*B64G 1/52* (2006.01)
*B64G 1/22* (2006.01)
*B32B 3/12* (2006.01)

(52) U.S. Cl.
CPC . *B64G 1/22* (2013.01); *B32B 3/12* (2013.01); *B32B 2605/18* (2013.01)

(58) Field of Classification Search
None
See application file for complete search history.

(56) References Cited

U.S. PATENT DOCUMENTS

| | | |
|---|---|---|
| 18,058 A | 8/1857 | Raymond |
| 2,969,826 A | 3/1956 | Allen et al. |
| 3,166,837 A | 1/1965 | Frick et al. |
| 3,233,315 A | 2/1966 | Levake |
| 3,243,929 A * | 4/1966 | Strandlund ............ E04C 2/384 52/211 |
| 3,253,323 A | 5/1966 | Saueressig |
| 3,491,569 A | 1/1970 | Sabirov |
| 3,711,040 A | 1/1973 | Carver |
| 3,825,167 A | 7/1974 | Komorek et al. |
| 3,910,374 A * | 10/1975 | Holehouse ........... G10K 11/172 181/292 |

(Continued)

FOREIGN PATENT DOCUMENTS

WO    WO-2009032585    3/2009

OTHER PUBLICATIONS

International Search Report and Written Opinion, International Application No. PCT/US2010/049396, Applicant: Blue Origin, LLC., mailed Nov. 17, 2010, 10 pages.

*Primary Examiner* — Medhat Badawi
(74) *Attorney, Agent, or Firm* — Perkins Coie LLP (57) ABSTRACT

Composite structures for space vehicles and other aerospace vehicles are disclosed herein. In one embodiment of the disclosure, a space vehicle pressure vessel includes composite panels or sidewalls with septumized core. In another embodiment, a splice joint for joining septumized composite panels in space vehicle structures is disclosed herein.

18 Claims, 8 Drawing Sheets

(56) References Cited

U.S. PATENT DOCUMENTS

| | | | | |
|---|---|---|---|---|
| 3,948,346 A * | 4/1976 | Schindler | E04B 1/86 | 181/286 |
| 4,084,739 A * | 4/1978 | Koltz | B23K 37/0531 | 228/168 |
| 4,154,641 A | 5/1979 | Hotton | | |
| 4,184,238 A * | 1/1980 | Carey | B23P 15/008 | 239/265.43 |
| 4,235,303 A * | 11/1980 | Dhoore | B64D 33/02 | 181/214 |
| 4,257,998 A * | 3/1981 | Diepenbrock, Jr. | B29C 33/52 | 181/222 |
| 4,265,955 A * | 5/1981 | Harp | B29D 24/005 | 181/292 |
| 4,344,591 A * | 8/1982 | Jackson | B64C 1/38 | 244/132 |
| 4,569,386 A * | 2/1986 | Mine | B21B 23/00 | 164/417 |
| 4,594,120 A * | 6/1986 | Bourland, Jr. | E04C 2/365 | 156/155 |
| 4,687,691 A * | 8/1987 | Kay | B29C 44/1266 | 156/252 |
| 4,889,276 A | 12/1989 | Cadwell et al. | | |
| 4,910,065 A * | 3/1990 | McKinney | B29C 67/0044 | 156/182 |
| 4,971,746 A * | 11/1990 | Ferrer | A01K 47/04 | 264/279 |
| 5,080,306 A * | 1/1992 | Porter | B32B 15/14 | 244/158.7 |
| 5,344,280 A * | 9/1994 | Langenbrunner | F01D 21/045 | 415/119 |
| 5,362,527 A * | 11/1994 | Harpell | B32B 3/22 | 2/2.5 |
| 5,390,846 A * | 2/1995 | Thode | B23K 9/326 | 219/74 |
| 5,435,478 A * | 7/1995 | Wood | B23K 9/0286 | 219/130.01 |
| 5,445,861 A * | 8/1995 | Newton | B32B 3/12 | 181/290 |
| 5,460,864 A * | 10/1995 | Heitkamp | B32B 3/12 | 156/197 |
| 5,460,865 A * | 10/1995 | Tsotsis | B32B 3/12 | 428/116 |
| 5,575,402 A * | 11/1996 | Botsolas | F17C 13/001 | 220/200 |
| 5,604,010 A * | 2/1997 | Hartz | B32B 3/12 | 156/327 |
| 5,662,761 A * | 9/1997 | Middelman | B29C 70/083 | 156/166 |
| 5,685,940 A * | 11/1997 | Hopkins | G10K 11/172 | 156/286 |
| 5,785,919 A * | 7/1998 | Wilson | B29C 67/0066 | 264/135 |
| 5,830,548 A * | 11/1998 | Andersen | B28B 1/00 | 206/524.3 |
| 5,873,549 A * | 2/1999 | Lane | B64G 1/24 | 102/384 |
| 5,895,699 A * | 4/1999 | Corbett | B32B 3/12 | 428/116 |
| 6,114,652 A * | 9/2000 | Clarke | B23K 26/381 | 219/121.71 |
| 6,180,206 B1 * | 1/2001 | Kain, Jr. | B32B 3/12 | 156/292 |
| 6,182,787 B1 * | 2/2001 | Kraft | F02C 7/045 | 181/292 |
| 6,199,745 B1 | 3/2001 | Campbell et al. | | |
| 6,253,655 B1 * | 7/2001 | Lyons | F41H 5/0428 | 89/36.02 |
| 6,450,395 B1 | 9/2002 | Weeks et al. | | |
| 6,488,323 B1 * | 12/2002 | Bouligny | B66C 1/46 | 269/22 |
| 6,509,081 B1 * | 1/2003 | Diamond | B32B 3/12 | 428/116 |
| 6,742,697 B2 * | 6/2004 | McTernan | B23K 20/12 | 228/112.1 |
| 6,871,725 B2 * | 3/2005 | Johnson | B64D 29/00 | 181/284 |
| 6,908,690 B2 | 6/2005 | Waldron et al. | | |
| 7,197,852 B2 * | 4/2007 | Grillos | B64C 1/12 | 52/144 |
| 7,434,659 B2 * | 10/2008 | Ayle | F02C 7/045 | 181/284 |
| 7,448,528 B2 | 11/2008 | Forrest et al. | | |
| 7,461,769 B2 | 12/2008 | Waldron et al. | | |
| 7,464,852 B2 | 12/2008 | Waldron et al. | | |
| 7,674,418 B2 | 3/2010 | Matsumoto et al. | | |
| 7,748,592 B2 | 7/2010 | Koga et al. | | |
| 7,785,098 B1 * | 8/2010 | Appleby | B29C 33/302 | 264/319 |
| 7,998,389 B2 * | 8/2011 | Burchett | B29C 45/14778 | 264/248 |
| 8,282,040 B1 * | 10/2012 | Westman | B64C 3/24 | 244/123.1 |
| 8,375,839 B2 * | 2/2013 | Landi | F41H 1/02 | 428/911 |
| 8,408,358 B1 * | 4/2013 | Hermiller | F02K 1/827 | 181/229 |
| 8,408,443 B2 | 4/2013 | Miryekta et al. | | |
| 8,475,894 B2 * | 7/2013 | Noble | B32B 3/10 | 428/116 |
| 8,491,743 B2 * | 7/2013 | Pham | B29C 70/44 | 156/229 |
| 8,511,429 B1 * | 8/2013 | Yu | E04B 9/045 | 181/290 |
| 8,534,530 B2 | 9/2013 | Biggs | | |
| 8,696,843 B1 * | 4/2014 | Dean | B32B 43/00 | 156/98 |
| 8,720,817 B1 * | 5/2014 | Kismarton | B64C 5/02 | 244/119 |
| 9,079,674 B1 * | 7/2015 | Grillos | B64G 1/58 | |
| 2001/0015157 A1 * | 8/2001 | Neal | B32B 3/06 | 109/49.5 |
| 2002/0070077 A1 * | 6/2002 | Porte | G10K 11/172 | 181/292 |
| 2002/0190103 A1 | 12/2002 | Yoshinaga | | |
| 2003/0150961 A1 * | 8/2003 | Boelitz | B64G 1/002 | 244/158.1 |
| 2004/0067364 A1 * | 4/2004 | Ishikawa | B32B 5/26 | 428/411.1 |
| 2004/0129763 A1 | 7/2004 | Burford et al. | | |
| 2004/0156478 A1 * | 8/2004 | Appleby | B23P 15/246 | 378/147 |
| 2006/0108058 A1 * | 5/2006 | Chapman | B29C 70/323 | 156/245 |
| 2006/0188696 A1 * | 8/2006 | Grose | B32B 3/02 | 428/156 |
| 2007/0238379 A1 * | 10/2007 | Bhatnagar | F41H 5/0457 | 442/135 |
| 2008/0179448 A1 * | 7/2008 | Layland | B64D 15/12 | 244/1 N |
| 2008/0256960 A1 * | 10/2008 | Greason | F17C 3/04 | 62/53.2 |
| 2009/0263627 A1 * | 10/2009 | Hand | F02C 7/24 | 428/172 |
| 2010/0078985 A1 | 4/2010 | Mahoney et al. | | |
| 2010/0170746 A1 * | 7/2010 | Restuccia | B29C 70/083 | 181/290 |
| 2010/0243803 A1 * | 9/2010 | Westre | B64C 1/18 | 244/119 |
| 2010/0276545 A1 * | 11/2010 | Chavagnac | B64D 27/023 | 244/158.9 |
| 2011/0012290 A1 | 1/2011 | Burchett et al. | | |
| 2011/0107808 A1 * | 5/2011 | Gil | B21D 5/14 | 72/224 |
| 2011/0133025 A1 * | 6/2011 | Vauchel | B64D 33/02 | 244/1 N |
| 2011/0189440 A1 * | 8/2011 | Appleby | B22C 9/04 | 428/156 |

(56) References Cited

U.S. PATENT DOCUMENTS

2012/0037449 A1* 2/2012 Ayle .................... G10K 11/172
 181/292
2012/0174748 A1 7/2012 Landi
2014/0077037 A1* 3/2014 Hand .................... B64G 1/402
 244/172.3
2014/0165361 A1* 6/2014 Stulc .................... B64C 1/069
 29/428

* cited by examiner

COMPOSITE STRUCTURES FOR AEROSPACE VEHICLES, AND ASSOCIATED SYSTEMS AND METHODS

CROSS-REFERENCE TO RELATED APPLICATION(S) INCORPORATED BY REFERENCE

The present application is a continuation application of U.S. patent application Ser. No. 13/029,007, filed Feb. 16, 2011, entitled COMPOSITE STRUCTURES FOR AEROSPACE VEHICLES, AND ASSOCIATED SYSTEMS AND METHODS, which is a continuation application of U.S. patent application Ser. No. 12/885,346, filed Sep. 17, 2010, entitled COMPOSITE STRUCTURES FOR AEROSPACE VEHICLES, AND ASSOCIATED SYSTEMS AND METHODS, which claims priority to U.S. Provisional Patent Application No. 61/244,006, filed Sep. 18, 2009, and entitled "COMPOSITE STRUCTURES FOR AEROSPACE VEHICLES, AND ASSOCIATED SYSTEMS AND METHODS," and U.S. Provisional Patent Application No. 61/244,008, filed Sep. 18, 2009, and entitled "COMPOSITE STRUCTURES FOR AEROSPACE VEHICLES, AND ASSOCIATED SYSTEMS AND METHODS," each of which is incorporated herein in its entirety by reference.

TECHNICAL FIELD

The present disclosure is directed generally to composite structures and, more particularly, to composite structures for space vehicles and associated systems and methods.

BACKGROUND

Rocket powered launch vehicles carry humans and other payloads into space. For example, rockets took the first humans to the moon and returned them safely home. Rockets also launch satellites and unmanned space probes, and carry supplies and personnel to the international space station. Despite the rapid advances in manned and unmanned space flight, however, delivering astronauts, satellites, and other payloads to space continues to be an expensive proposition.

Although NASA's space shuttle is largely reusable, reconditioning the reusable components is a costly and time consuming process that requires extensive ground based infrastructure. Moreover, the additional shuttle systems required for reentry and landing reduce the payload capability of the Shuttle.

Pressure vessels on conventional spacecraft (e.g., payload capsules, crew capsules, tanks, etc.) are typically made of aluminum, stainless steel, titanium, and/or other metals which can be relatively heavy, expensive, or both. Because of weight restrictions, capsules are typically made of a single layer of material, which may provide limited structural redundancy in the event of damage. Aspects of the present disclosure are directed to addressing these challenges.

DETAILED DESCRIPTION

The present disclosure is directed generally to composite structures, such as septumized composite structures for space vehicles. Several details describing structures and processes that are well-known and often associated with composite materials and composite part manufacturing techniques are not set forth in the following description to avoid unnecessarily obscuring embodiments of the disclosure. Moreover, although the following disclosure sets forth several embodiments, several other embodiments can have different configurations, arrangements, and/or components than those described in this section. In particular, other embodiments may have additional elements, and/or may lack one or more of the elements described below with reference to FIGS. 1A-5C.

Figure 1A:
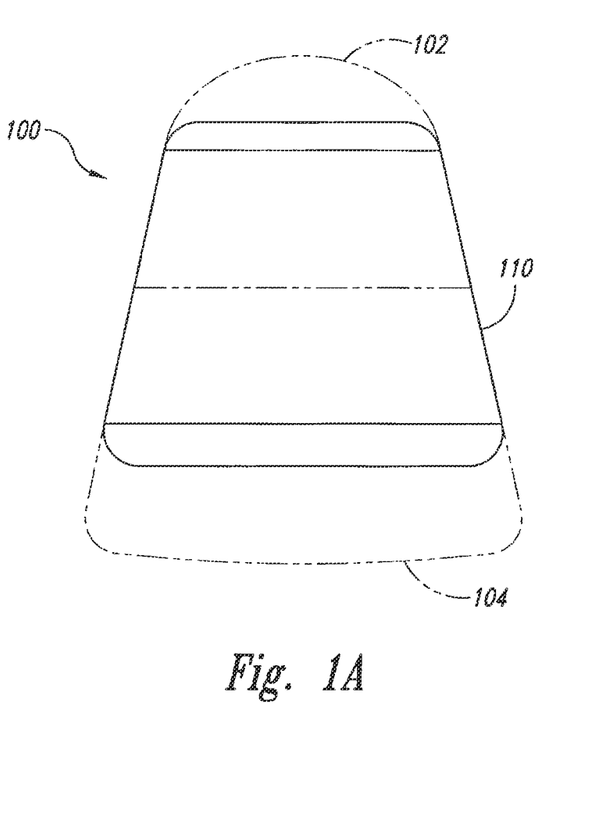
FIG. 1A is a schematic side view of a space vehicle structure configured in accordance with an embodiment of the disclosure.
Figure 1B:
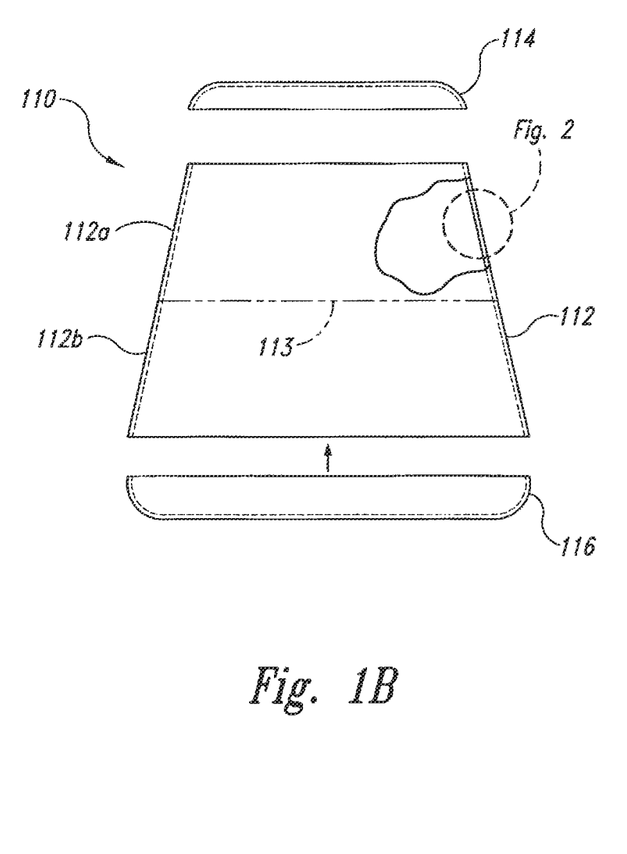
FIG. 1B is a partially exploded schematic side view of the space vehicle structure of FIG. 1A.

FIG. 1A is a schematic diagram illustrating a composite structure configured in accordance with an embodiment of the disclosure, and FIG. 1B is a partially expanded schematic diagram of the composite structure. Referring first to FIG. 1A, in the illustrated embodiment the composite structure is a space vehicle structure 100, such as a suborbital or orbital capsule or other pressure vessel. More specifically, in the illustrated embodiment the space vehicle structure 100 is a capsule having a crew cabin 110. A forward section, such as a nose section 102 can be attached to a forward end portion of the crew cabin 110, and an aft bulkhead or aft section 104 can be similarly attached toward an aft end of the crew cabin 110.

Referring next to FIG. 1B, in the illustrated embodiment the crew cabin 110 is a hollow pressure vessel having a forward bulkhead or cap 114 sealably spliced to a forward end of a body or sidewall section 112, and an aft bulkhead or cap 116 sealably spliced to the aft end of the sidewall section 112. As described in greater detail below, the sidewall section 112, the forward cap 114 and/or the aft cap 116 can be constructed of a septumized composite sandwich that provides increased damage tolerance, reduced weight, and structural redundancy.

In the illustrated embodiment, the sidewall section 112 can be formed from two or more relatively large barrel or annular ring sections which are spliced together in accordance with various embodiments of the disclosure described in detail below. For example, the sidewall section 112 can be formed from a first ring section 112a that is joined to a second ring section 112b along a circumferential joint 113. Although the sidewall section 112 of the illustrated embodiment has a conical shape, in other embodiments, other composite pressure vessels configured in accordance with the present disclosure can have other shapes, including cylindrical shapes, curved or give shapes, etc. Moreover, although the composite structure of the illustrated embodiment is a space vehicle structure 100, the methods, systems and/or structures disclosed herein can also be used to make and use other types of composite structures, such as other types of pressure vessels, hypersonic vehicles, aircraft, surface ships and underwater vehicles. Accordingly, the present disclosure is not limited to space vehicle structures.

Figure 2:
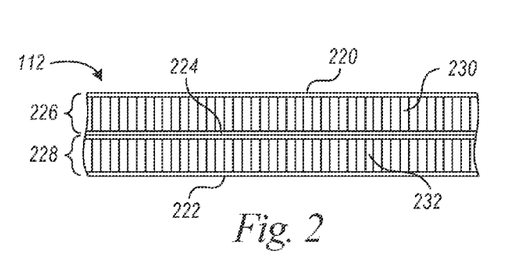
FIG. 2 is an enlarged cross-sectional view of a composite sandwich panel configured in accordance with an embodiment of the disclosure.

FIG. 2 is an enlarged cross-sectional view of a portion of the sidewall section 112 configured in accordance with an embodiment of the disclosure. In the illustrated embodiment, the sidewall section 112 includes a first face sheet 220 spaced apart from a second face sheet 222, and an intermediate layer or sheet 224 positioned between the first face sheet 220 and the second face sheet 222 to form a septum. The sidewall section 112 further includes a first core portion 230 adhesively bonded between the first face sheet 220 and the intermediate sheet 224, and a second core portion 232 adhesively bonded between the intermediate sheet 224 and the second face sheet 222.

In the illustrated embodiment, the outer or first face sheet 220, the inner or second face sheet 222, and the intermediate sheet 224 can be comprised of a plurality of laminated plies of fiber reinforced resin material, such as fiber fabric reinforced epoxy resin. In one embodiment, for example, the laminated plies can include graphite/epoxy, pre-preg, and woven fabric such as Toray T700SC-12 K-50C/#2510. In other embodiments, at least the first face sheet 220 can include a layer of material with a relatively high ballistic modulus or resistance to damage from ballistic impact, such as a layer of Kevlar® material (para-aramid synthetic fiber), and/or a layer of electrically conductive material. Moreover, any one of the first face sheet 220, the second face sheet 222, and/or the intermediate sheet 224 can include one or more layers of low porosity material to at least reduce pressure leakage from the pressure vessel. In other embodiments, however, other types of laminated material layers can be used to form the face sheets 220 and 222, and the intermediate sheet 224.

In another aspect of this embodiment, the first core portion 230 and the second core portion 232 can be comprised of a honeycomb core, such as a phenolic or aluminum honeycomb core that is perforated to facilitate venting. For example, the first core portion 230 and the second core portion 232 can be comprised of Hexcel Aluminum Standard Core CRLLL-1/8-5056-0.002 perforated; and/or Hexcel Aluminum Flex Core CRLLL-5052/F40-0.0037S 5.7 perforated. In the illustrated embodiment, the first core portion 230 and the second core portion 232 can be about 0.5 inch thick, resulting in an overall panel width of from about 0.75 inch to about 1.5 inches, or about 0.9 inch to about 1.2 inches, or about 1 inch. In other embodiments, the first core portion 230 and the second core portion 232 can be comprised of other suitable core materials, including other suitable honeycomb materials, and closed and/or open cell foam materials, and can have other thicknesses.

The sidewall section 112 can be manufactured in one embodiment by first laying up one or more plies of composite fabric (e.g., pre-preg graphite/epoxy fabric) on a suitable lay up mandrel to form the inner or second face sheet 222, and then applying a layer of adhesive, such as EA-9696 epoxy film adhesive from Hysol (not shown) to the outer surface of the second face sheet 222. Next, the second core portion 232 can be positioned on the second face sheet 222, and another layer of adhesive can be applied to the outer surface of the second core portion 232. The one or more plies of material making up the intermediate sheet 224 can then be positioned on the second core portion 232, and another layer of adhesive can be applied to the outer surface of the intermediate sheet 224. The first core portion 230 can then be positioned on the intermediate sheet 224, and another layer of adhesive can be positioned on the outer surface of the first core portion 230. The one or more plies making up the first face sheet 220 can then be positioned on the outer surface of the first core portion 230, and the assembly can be vacuum-bagged and debulked for curing using suitable methods and systems known in the art.

Figure 2A:
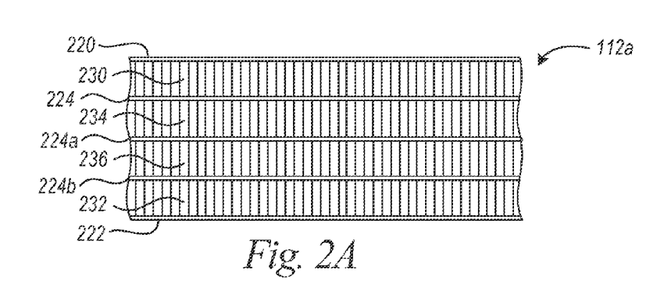
FIG. 2A is an enlarged cross-sectional view of a composite sandwich panel configured in accordance with another embodiment of the disclosure.

The foregoing construction of the sidewall section 112 creates a structural member which can be described as a first composite sandwich layer 226 and a second composite sandwich layer 228. The redundancy provided by the dual sandwich layers can increase damage resistance. For example, if the outer face sheet 220 and adjacent core portion 230 are damaged from, for example, a micro-meteor strike, the inner sandwich layer 228 can carry the design limit loads without failure. Although the sidewall section 112 of the illustrated embodiment includes a single septum (e.g., the septum formed by the intermediate sheet 224), those of ordinary skill in the art will appreciate that other sidewall sections and composite structures configured in accordance with the present disclosure can include more than one septum without departing from the spirit or scope of the present disclosure. For example, in other embodiments the methods and systems disclosed herein can be used make composite panels and other structures having two, three or more septums depending on the needs of the particular application. FIG. 2A, for example, is an enlarged cross-sectional view of a portion of a sidewall section 112a having second and third intermediate sheets 224a and 224b, respectively, and third and fourth core portions 234 and 236, respectively. The second and third intermediate sheets 224a and 224b are spaced apart from the first intermediate sheet 224 and disposed between the first face sheet 220 and the second face sheet 222. The third core portion 234 is disposed between the first intermediate sheet 224 and the second intermediate sheet 224a, and the fourth core portion 236 is disposed between the second intermediate sheet 224a and the third intermediate sheet 224b.

Figure 3A:
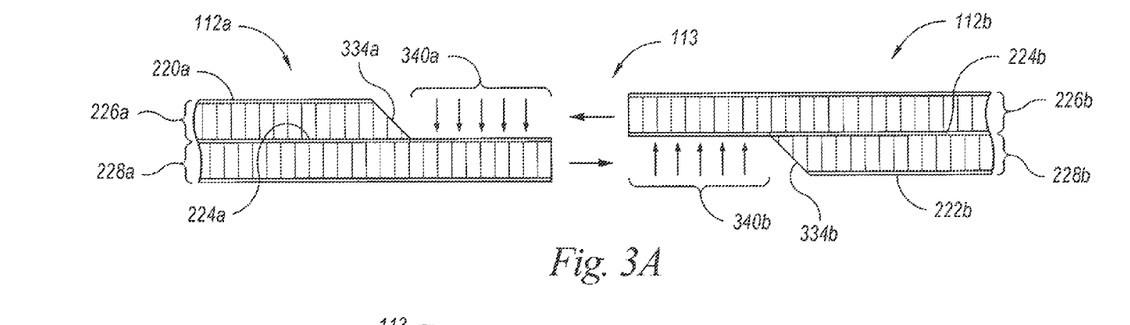
FIGS. 3A-3F are cross-sectional views illustrating various stages in a method of forming a structural splice joint in a composite sandwich structure in accordance with an embodiment of the disclosure.

FIGS. 3A-3F are a series of cross-sectional views illustrating various stages in a method of forming a composite panel splice joint in accordance with an embodiment of the disclosure. By way of example, in one embodiment the splice joint described with reference to FIGS. 3A-3F and suitable variations thereof can be used to form the splice joint 113 between the first composite section 112a and the second composite section 112b shown in FIG. 1B. Referring first to FIG. 3A, an edge portion of the first outer sandwich layer 226a includes a first ramp surface 334a formed from the first face sheet 220a. Similarly, an edge portion of the second inner sandwich layer 228b includes a second ramp surface 334b made up of the second face sheet 222b. Prior to bonding the first composite section 112a to the second composite section 112b, a first faying surface portion 340a of the first inner sandwich layer 228a is grit blasted with, for example, an aluminum oxide or other suitable medium to clean the surface 340a and prepare it for adhesive bonding. A second faying surface portion 340b of the second outer sandwich layer 226b is similarly grit blasted.

Figure 3B:
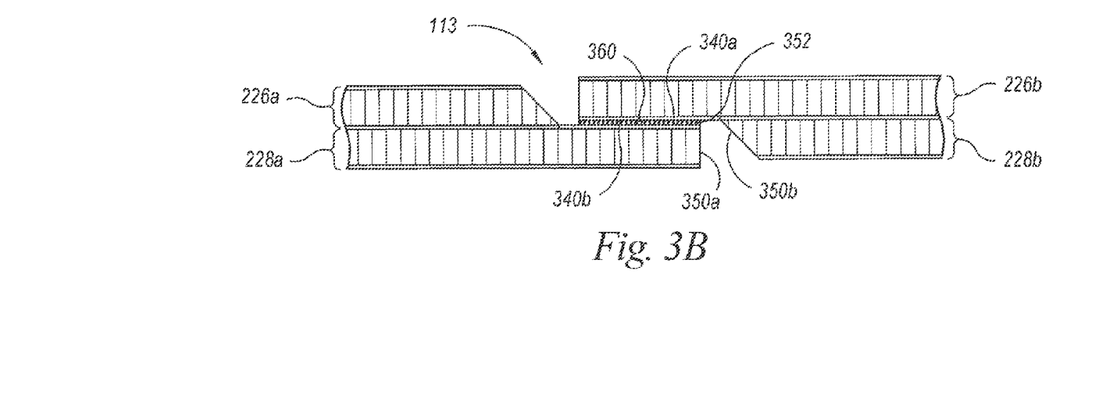

Referring next to FIG. 3B, adhesive 352, such as an epoxy paste adhesive like Hysol EA-9394, or other suitable adhesives known in the art, is applied to the faying surfaces of the first inner sandwich layer 228a and the second outer sandwich layer 226b. The edge portion of the second outer sandwich layer 226b is then positioned over the edge portion of the first inner sandwich layer 228a as shown in FIG. 3B.

In the illustrated embodiment, a gap of from about 0.02 inch to about 0.06 inch, such as about 0.04 inch, can exist between the faying surfaces of the first composite section 112a and the second composite section 112b for bonding. In addition, a first edge 350a of the first inner sandwich layer 228a can be spaced apart from a second edge 350b at the bottom of the ramp surface 334b by a distance from about 0.15 inch to about 0.4 inch, or about 0.25 inch. In other embodiments, the faying surfaces of the composite sections 112 and/or the distance between the respective edges can vary depending on the particular structural application or manufacturing method employed.

In one particular embodiment, a spacer, such as a filament 360 (e.g., a round filament shown in end view and FIG. 3B) can be positioned between the faying surfaces 340a and 340b to control the gap therebetween while the adhesive 352 is curing. In other embodiments, other systems and methods can be used to control the relative position of the composite sections 112 during the bonding process.

Figure 3C:
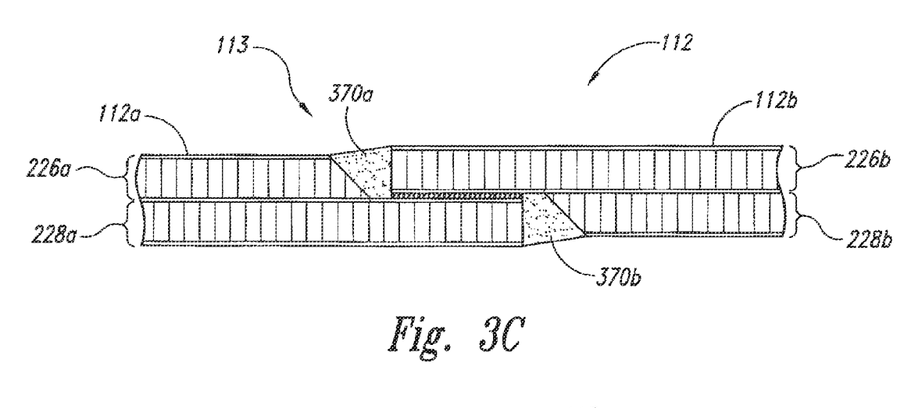

Referring next to FIG. 3C, after the composite sections 112 have been bonded together, a suitable potting compound, such as L-306 potting compound provided by JD Lincoln Company of 851, West 18th Street, Costa Mesa, Calif. 92627, can be used to fill the gaps between the opposing edge portions of the composite sandwiched layers 226 and 228. In one embodiment, the L-306 potting compound is a lightweight, room-temperature curing, "edge filler" compound. In other embodiments, other suitable potting compounds, adhesives and/or other filler materials can be used to fill the gaps between the composite sandwiched layer edge portions as shown in FIG. 3C.

Figure 3D:
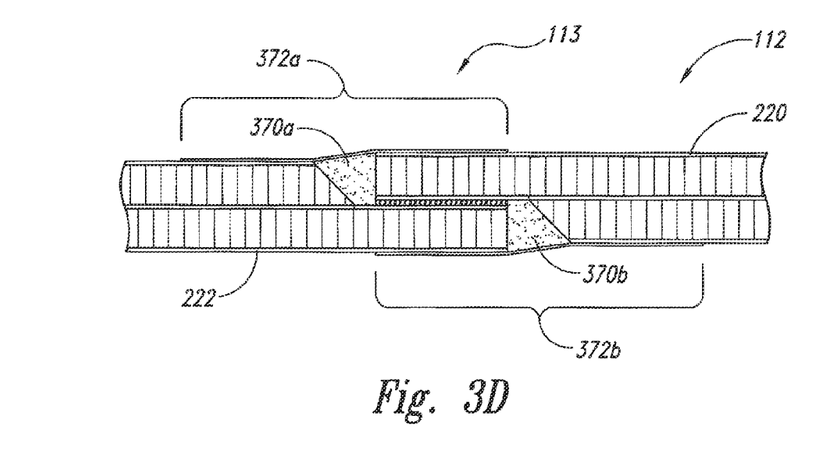

Referring next to FIG. 3D, after the potting compound 370 has cured, the exterior surfaces of the potting compound can be sanded smooth, and then a first surface area 372a on the first face sheet 220 can be grit blasted with a suitable media, such as aluminum oxide, and a second surface area 372b on the second face sheet 222 can be similarly grit blasted. In the illustrated embodiment, the prepared surfaces 372 can extend for about two inches on either side of the compound 370. Grit blasting the surfaces in this manner can help prepare and clean the surface for proper adhesion of subsequent adhesive applications.

Figure 3E:
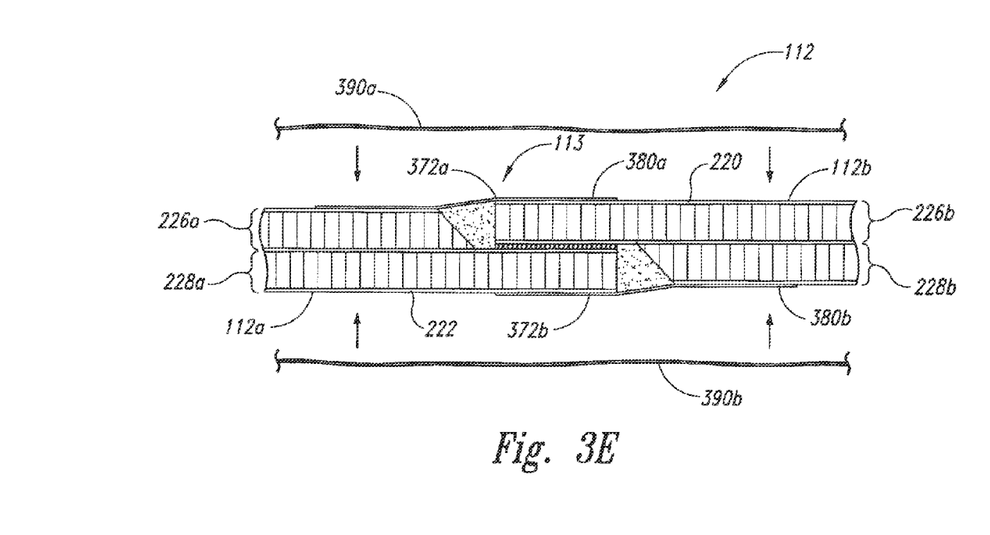

Referring next to FIG. 3E, one or more dry fabric plies 380a, such as graphite fabric plies, can be applied over the adjacent edge portions of the first and second outer composite sandwich layers 226a, 226b, and one or more dry fabric plies 380b can be similarly applied over the adjacent edge portions of the first and second inner composite sandwich layers 228a, 228b. In one embodiment, the dry fabric plies 380 can include dry graphite fabric overwraps such as material type BMS9-8 Type 1 Class II Style 3K-70-PW. In other embodiments, other types of dry graphite fabric and/or fabric pre-impregnated with resin can be used to overwrap the joint and provide a structural splice.

In the embodiment where dry graphite fabric is used, a suitable resin, such as a suitable epoxy laminating resin such as Hysol EA-9396, is applied to the dry graphite fabric to infuse the fabric with the resin. After the fabric and resin have been applied as shown in FIG. 3E, a first vacuum bag 390a can be installed over the first doubler plies 380a, and a second vacuum bag 390b can be installed over the second doubler plies 380b. The vacuum bags 390 can then be evacuated and/or de-bulked to compress the splice joint 113 between the doubler plies 380 for curing of the resin. In other embodiments, the splice joint 113 and/or the doubler plies 380 can be cured in a suitable autoclave. As shown in FIG. 3E, in one embodiment the doublers 380 can extend from about one inch to about three inches, or about 1.5 inches over the adjacent edge portions of the respective composite panel sections 112. In other embodiments, the doublers 380 can have other dimensions.

Figure 3F:
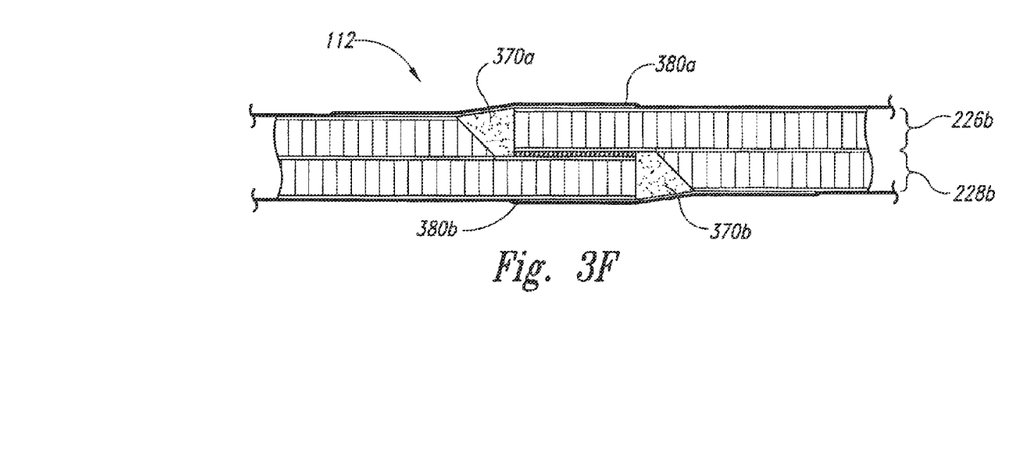

Referring next to FIG. 3F, this figure is a cross-sectional view of a splice joint 310 that joins two septumized composite sandwich panels together using a method that is at least generally similar to the method described above in reference to FIGS. 3A-3E.

FIGS. 4A-4F are a series of plan views illustrating various stages in the method for bonding a doubler splice 480 to adjacent edge portions of two or more composite sandwich panels 412 in accordance with an embodiment of the disclosure. The doubler bonding process described herein can be used to bond a doubler to virtually any type of surface or member, not just composite panels. For example, the methods described herein can be used to bond a suitable doubler to, e.g., metal panels, metal/composite panels, organic material panels, etc.

Figure 4A:
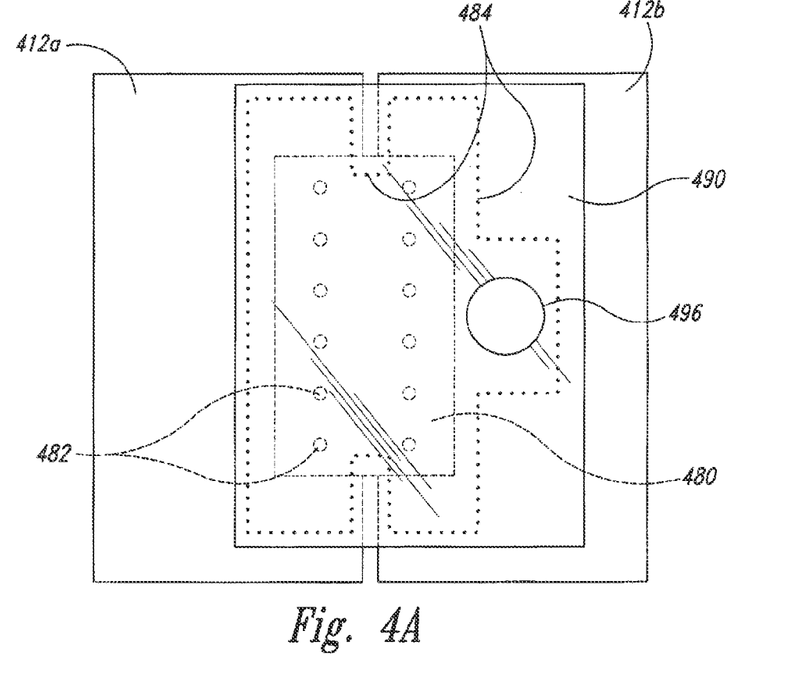
FIGS. 4A-4F are a series of plan views illustrating various stages in a method of bonding a doubler between two composite panels in accordance with another embodiment of the disclosure.

Referring first to FIG. 4A, as this view illustrates the edges of the first and second panel sections 412a and 412b are positioned adjacent to each other in generally planar alignment. In one embodiment, the bonding process begins by determining the periphery of a vacuum bag around the doubler 480 for application of bagging edge tape (e.g., zinc chromate) or other suitable sealing material or device 484. The bag seal 484 should bridge over a portion of the doubler 480 in the vicinity of the gap between the adjacent structural panels 412 as shown in FIG. 4A. Next, the doubler 480 can be covered with a protective material, such as tape (not shown), on the non-bonded surface. The doubler 480 and the protective material can then be drilled as shown to produce the holes 482. In addition to the foregoing steps, the portion of the composite panels 412 that will not be bonded to the doubler 480 can also be covered by a protective material, such as tape, where a bond is not desired. Additional steps can include positioning a bagging film 490 over the doubler 480 and attaching a suitable evacuating device to a vacuum port 496. These and other steps are described in more detail below with reference to FIGS. 4B-4F.

Figure 4B:
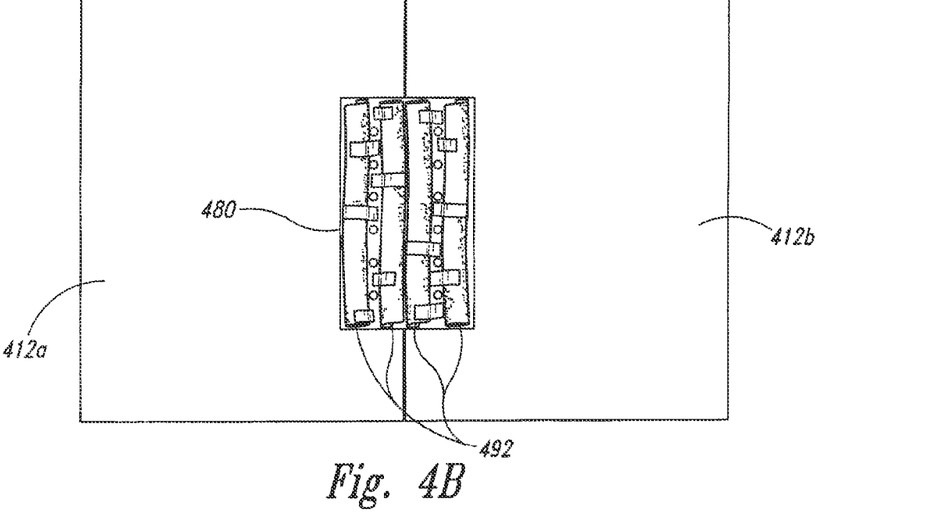
Figure 4C:
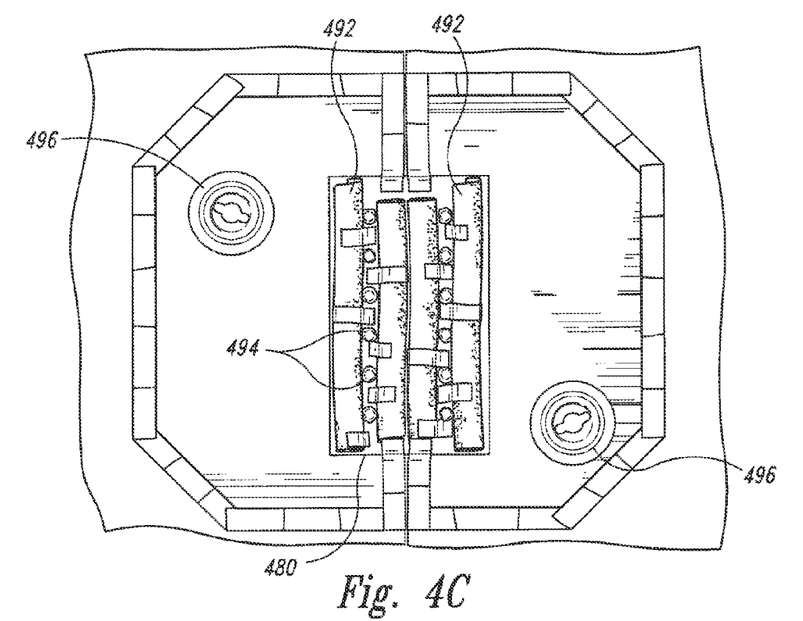

Referring next to FIG. 4B, breather material, such as rolled-up breather material 492 can be positioned on the doubler 480 in between the adjacent rows of holes 482 (FIG. 4A) on the non-bonded side of the doubler 480. The rolled breather material 492 can be taped in place. Next, a suitable adhesive, such as an epoxy film adhesive, can be uniformly applied to the faying surfaces between the doubler 480 and the composite panels 412. The doubler 480 can then be positioned in place on the composite panels 412 and secured with tape if necessary. Adhesive 494 may flow into the holes 482 (FIG. 4A) as shown in FIG. 4C. Vacuum device supports 496 are also shown in FIG. 4C.

Figure 4D:
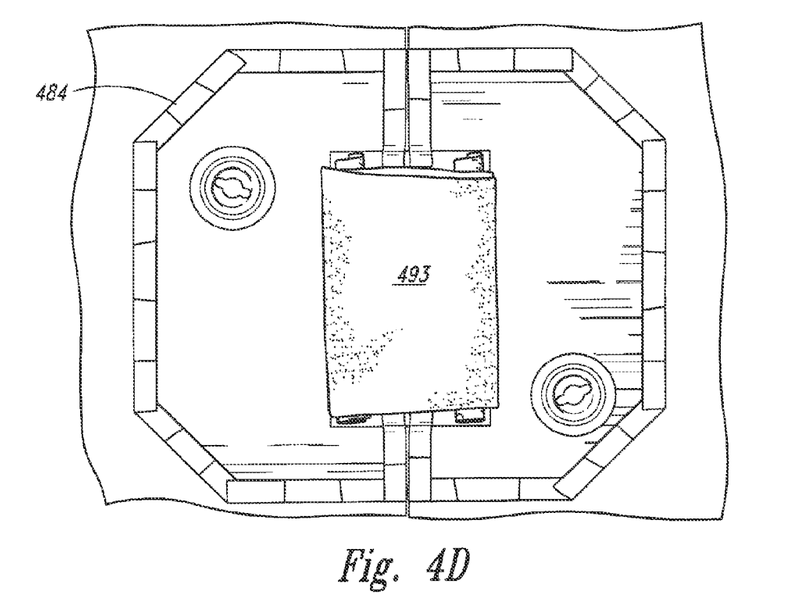
Figure 4E:
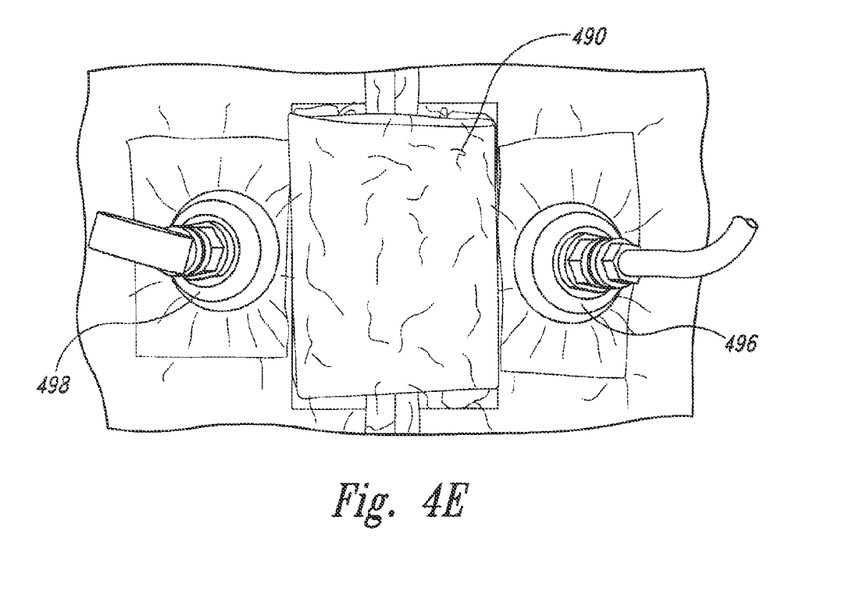
Figure 4F:
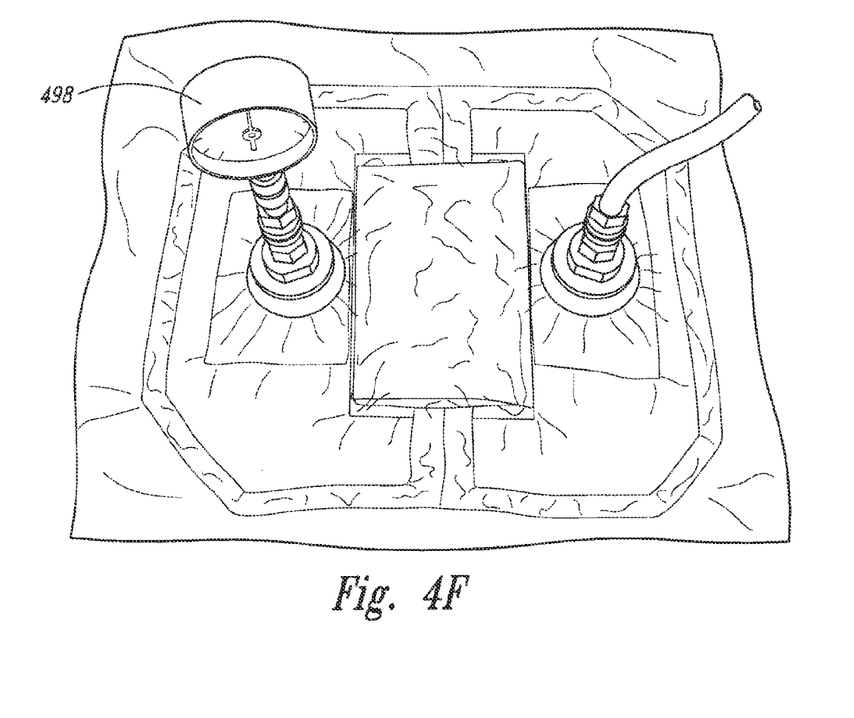

As shown in FIG. 4D, an additional portion of breather material 493, such as breather material folded in the form of a blanket or pad, can also be positioned over the rolled up breather material 492 (FIG. 4B). Referring to FIGS. 4D and 4E together, the bagging film 490 can then be positioned over the breather material 493 and sealed against the edge tape (e.g., zinc-chromate edge tape) 484. A vacuum port 497 is then operably and sealably attached to the bagging film 490 and the volume underneath the film is evacuated, or at least partially evacuated, for a predetermined amount of time required to let the adhesive 494 cure. A vacuum gauge 498 can be suitably attached to the bagging film 490 as shown on FIGS. 4E and 4F to monitor the pressure on the doubler 480 during the curing process. After the adhesive is cured, the bagging film 490, sealing tape 484, and breather materials 492 and 493 can be removed, and excess material can be cleaned from the bonded joint.

Figure 5A:
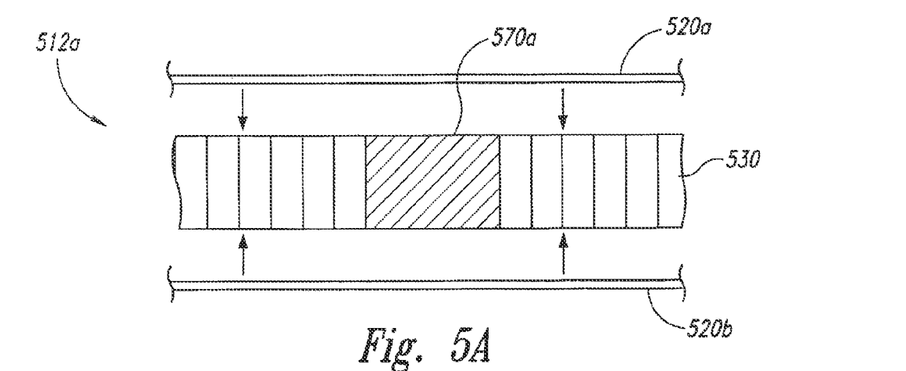
FIGS. 5A-5C are a series of cross-sectional views illustrating various stages in a method of reinforcing composite sandwich panels with potting compound to accept a bolt or other suitable fastener in accordance with a further embodiment of the disclosure.
Figure 5B:
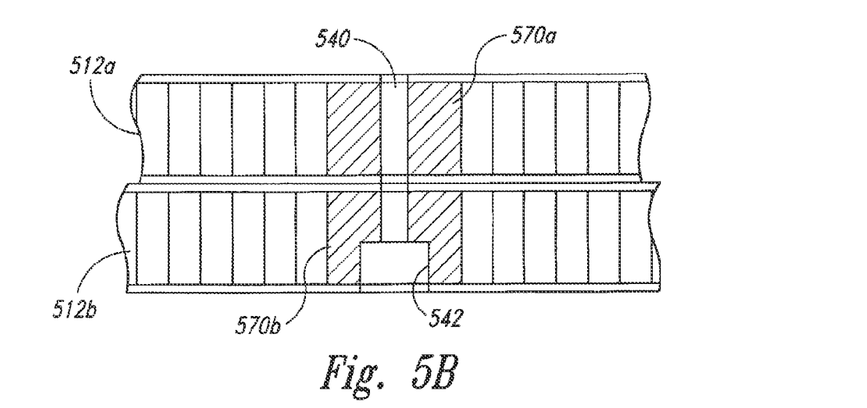
Figure 5C:
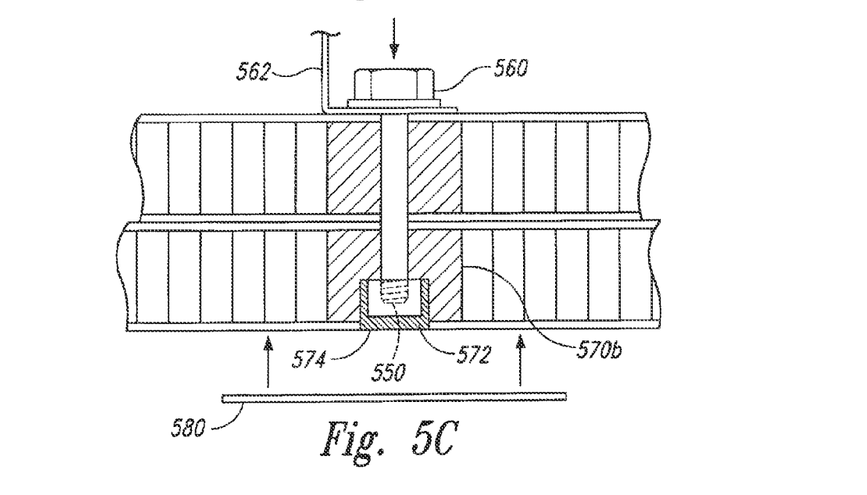

FIGS. 5A-5C are a series of cross sectional views illustrating various stages in the method of applying potting compound to composite sandwich panels 512 to enable the panels 512 to be fastened together with a suitable fastener 560 in accordance with an embodiment of the disclosure. Referring first to FIG. 5A, in the illustrated embodiment a piece of core 530 is machined or otherwise hogged-out in a location where it is desired to install a fastener. The opened area created by the hog-out is then filled with potting compound 570a as shown in FIG. 5A. Next, a first face sheet 520a and second face sheet 520b can be bonded or otherwise laminated to the outer surfaces of the core 530 using various suitable techniques known in the art.

Referring next to FIG. 5B, a second composite sandwich panel 512b that is at least generally similar in structure and function to the first composite panel 512a can be positioned adjacent to the first panel 512a so that the first portion of potting compound 570a is adjacent to a second portion of potting compound 570b in the second composite panel 512b. A through-hole 540 can then be drilled or otherwise formed through the potting compounds 570, and a countersink or larger opening or hole 542 can then be formed from the backside of the second composite panel 512b.

Referring next to FIG. 5C, a nutplate 572, such as a domed or sealed nut plate, can be fastened and/or adhesively bonded into the recess created by the second hole 542 with additional potting compound 574. As is known, the nutplate 572 and similar fastening devices include a nut or a similarly threadable engagement feature configured to receive male threads on a bolt 560 or other suitable threaded fastener. In other embodiments, potted-in type threaded inserts, such as an AEP Torlon insert (e.g., an AEP1035 floating nut, blind threaded, potted-in type insert from Marketing Masters, Inc. of 1871 NW Gilman Blvd., Issaquah, Wash. 98027) can be used in place of the nutplate 572. Once the nutplate 572 has been bonded in place, the fastener 560 can be removed so that the composite panels 512 can be disassembled. Moreover, an overwrap layer or doubler ply 580 can be applied over the potting compound 574 and bonded to the adjacent area of the second panel 512b.

The potted structure illustrated in FIG. 5C enables the panels 512 to be subsequently joined together with only blind access to the outer side of the first composite panel 512a. Moreover, the method of potting and fastening described above with reference to FIGS. 5A-5C can also be employed for attaching equipment, structural members (e.g., a bracket 562), and/or other objects to one or more composite panels.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A space vehicle configured to contain at least one of crew or payload, the space vehicle comprising:
   a first septumized composite sandwich panel that forms a first outer wall portion of the space vehicle;
   a second septumized composite sandwich panel that forms a second outer wall portion of the space vehicle, wherein each of the first and second septumized composite sandwich panels comprises
      an outer face sheet that forms an exterior surface of the outer wall of the space vehicle;
      an inner face sheet spaced apart from the outer face sheet;
      at least one intermediate sheet disposed between the outer and inner face sheets;
      a first core portion disposed between the outer face sheet and the intermediate sheet; and
      a second core portion disposed between the inner face sheet and the intermediate sheet; and
   a joint attaching the first septumized composite sandwich panel to the second septumized composite sandwich panel,
   wherein the outer face sheet and the first core portion of the first septumized composite sandwich panel define a first edge portion, and the inner face sheet, the second core portion and the intermediate sheet of the first septumized composite sandwich panel define a second edge portion offset from the first edge portion to form a first step,
   wherein the outer face sheet, the intermediate sheet, and the first core portion of the second septumized composite sandwich panel define a third edge portion, and the inner face sheet and the second core portion of the second septumized composite sandwich panel define a fourth edge portion offset from the third edge portion to form a second step, and
   wherein the first step faces the second step and the second edge portion is bonded to the third edge portion at the joint.

2. The space vehicle of claim 1 wherein the outer and inner face sheets, the intermediate sheets, and the first and second core portions form a pressure vessel.

3. The space vehicle of claim 1 wherein the outer and inner face sheets, the intermediate sheets, and the first and second core portions form a pressure vessel configured to maintain an internal pressure that is greater than an external pressure.

4. The space vehicle of claim 1 wherein the outer and inner face sheets, the intermediate sheets, and the first and second core portions form a space vehicle capsule.

5. The space vehicle of claim 1 wherein the outer face sheets, the inner face sheets, and the intermediate sheets are comprised of fiber reinforced epoxy fabric, and wherein the first and second core portions are comprised of a honeycomb core.

6. The space vehicle of claim 1 wherein at least the outer face sheets include a layer of electrically conductive material.

7. The space vehicle of claim 1 wherein at least the outer face sheets include a layer of material with a high ballistic modulus.

8. The space vehicle of claim 1 wherein at least the outer face sheets include a layer of para-aramid synthetic fiber material.

9. The space vehicle of claim 1 wherein the space vehicle is a pressure vessel, and wherein each of the septumized composite sandwich panels includes a low porosity sealing layer to at least reduce pressure leakage from the pressure vessel.

10. The space vehicle of claim 1 wherein the intermediate sheet of the first septumized composite sandwich panel is a first intermediate sheet, and wherein the first septumized composite sandwich panel further comprises:
- at least a second intermediate sheet disposed between the outer and inner face sheets and spaced apart from the first intermediate sheet; and
- a third core portion disposed between the first intermediate sheet and the second intermediate sheet.

11. The space vehicle of claim 1 wherein the first septumized composite sandwich panel further comprises:
- four or more core portions disposed between the outer and inner face sheets; and
- three or more intermediate sheets alternatingly interposed between each of the core portions.

12. The space vehicle of claim 1 wherein the septumized composite sandwich panels form a sidewall portion of the space vehicle.

13. The space vehicle of claim 1 wherein the septumized composite sandwich panels form a cylindrical sidewall portion of the space vehicle.

14. The space vehicle of claim 1 wherein the septumized composite sandwich panels form a cylindrical sidewall portion of the space vehicle, and wherein the space vehicle further comprises:
- a forward cap sealably attached to a forward end of the cylindrical sidewall portion; and
- an aft cap sealably attached to an aft end of the cylindrical sidewall portion, wherein the cylindrical sidewall portion, the forward cap, and the aft cap form a pressure vessel.

15. The space vehicle of claim 1 wherein the septumized composite sandwich panels form a cylindrical sidewall portion of the space vehicle, and wherein the space vehicle further comprises:
- a forward cap sealably attached to a forward end of the cylindrical sidewall portion, wherein the forward cap is formed from a septumized composite sandwich structure; and
- an aft cap sealably attached to an aft end of the cylindrical sidewall portion, wherein the aft cap is formed from a septumized composite sandwich structure, and wherein the cylindrical sidewall portion, the forward cap, and the aft cap form a pressure vessel.

16. The space vehicle of claim 1 wherein the septumized composite sandwich panels form a damage resistant outer wall of the space vehicle in which (a) the intermediate sheet, the second core portion, and the inner face sheet are constructed to perform in flight without structural failure when the outer face sheet and the first core portion are damaged, or (b) the intermediate sheet, the first core portion, and the outer face sheet are constructed to perform in flight without structural failure when the inner face sheet and the second core portion are damaged, or (a) and (b).

17. The space vehicle of claim 1 wherein the outer face sheet of the first septumized composite sandwich panel is aligned with the outer face sheet of the second septumized composite sandwich panel, and the inner face sheet of the first septumized composite sandwich panel is aligned with the inner face sheet of the second septumized composite sandwich panel.

18. The space vehicle of claim 1 wherein the first septumized composite sandwich panel is a first sidewall portion of a pressure vessel, and wherein the second septumized composite sandwich panel is a second sidewall portion of the pressure vessel.

\* \* \* \* \*